(12) United States Patent
Tan et al.

(10) Patent No.: US 10,438,329 B2
(45) Date of Patent: Oct. 8, 2019

(54) IMAGE PROCESSING METHOD AND IMAGE PROCESSING APPARATUS

(71) Applicant: Tencent Technology (Shenzhen) Company Limited, Shenzhen (CN)

(72) Inventors: Guofu Tan, Shenzhen (CN); Jilin Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 22 days.

(21) Appl. No.: 15/699,691

(22) Filed: Sep. 8, 2017

(65) Prior Publication Data

US 2017/0372459 A1 Dec. 28, 2017

Related U.S. Application Data

(63) Continuation-in-part of application No. PCT/CN2016/097356, filed on Aug. 30, 2016.

(30) Foreign Application Priority Data

Sep. 29, 2015 (CN) .......................... 2015 1 0631783

(51) Int. Cl.
*G06T 5/00* (2006.01)
*G06T 7/13* (2017.01)
(Continued)

(52) U.S. Cl.
CPC .......... *G06T 5/005* (2013.01); *G06K 9/00281* (2013.01); *G06T 7/12* (2017.01);
(Continued)

(58) Field of Classification Search
CPC ................. G06K 9/00234; G06K 9/74; G06K 2009/00322; G06T 5/005
(Continued)

(56) References Cited

U.S. PATENT DOCUMENTS 6,919,288 B2 * 7/2005 Yamamoto .......... C23C 14/0641
106/286.2
7,071,167 B2 * 7/2006 Renault .................... A61K 8/19
514/18.8
(Continued)

FOREIGN PATENT DOCUMENTS

CN 101751559 A 6/2010
CN 101916370 A 12/2010
(Continued)

OTHER PUBLICATIONS

Tencent Technology, ISRWO, PCT/CN2016/097356, Dec. 1, 2016, 8 pgs.
Tencent Technology, IPRP PCT/CN2016/097356, Apr. 3, 2018, 7 pgs.

*Primary Examiner* — Yosef Kassa
(74) *Attorney, Agent, or Firm* — Morgan, Lewis & Bockius LLP

(57) ABSTRACT

The method provided in the present disclosure includes: obtaining an image photographed by a camera, and performing face detection on the image by using a face detection algorithm, to obtain a face pixel set from the image; positioning a facial feature contour mask over the face pixel set, to obtain a to-be-examined pixel set from the face pixel set, the to-be-examined pixel set including: a plurality of pixels within an image area except pixels masked by the facial feature contour mask in the face pixel set; performing edge contour detection on the to-be-examined pixel set, and extracting one or more blemish regions from the to-be-examined pixel set, to obtain a to-be-retouched pixel set, the to-be-retouched pixel set including: a plurality of pixels within an image area belonging to the blemish regions; and retouching all pixels in the to-be-retouched pixel set, to obtain a retouched pixel set.

18 Claims, 6 Drawing Sheets

(51) Int. Cl.
    *H04N 5/262*     (2006.01)
    *G06T 7/12*     (2017.01)
    *G06K 9/00*     (2006.01)
    *H04N 5/232*     (2006.01)

(52) U.S. Cl.
    CPC .............. *G06T 7/13* (2017.01); *H04N 5/2621* (2013.01); *G06T 2200/24* (2013.01); *G06T 2207/10024* (2013.01); *G06T 2207/30201* (2013.01); *H04N 5/23219* (2013.01)

(58) Field of Classification Search
    USPC ....... 382/118, 128, 165, 190, 213, 255, 266, 382/247, 275, 282; 358/537, 538, 452, 358/453, 463
    See application file for complete search history.

(56) References Cited

U.S. PATENT DOCUMENTS

| | | | | |
|---|---|---|---|---|
| 7,079,158 B2* | 7/2006 | Lambertsen | ......... | A45D 44/005 345/592 |
| 7,233,693 B2* | 6/2007 | Momma | .............. | A61B 5/0064 382/162 |
| 7,454,046 B2* | 11/2008 | Chhibber | ............... | A61B 5/442 382/118 |
| 7,556,605 B2* | 7/2009 | Qu | ....................... | A61B 5/0055 600/587 |
| 7,711,610 B2* | 5/2010 | Iwaki | ................. | G06Q 30/0621 424/401 |
| 8,564,778 B1* | 10/2013 | Igarashi | ............... | A45D 44/005 356/402 |
| 8,625,864 B2* | 1/2014 | Goodman | ............... | G06F 19/00 382/128 |
| 8,693,768 B1* | 4/2014 | LaForgia | ............ | A45D 44/005 222/1 |
| 2002/0172419 A1 | 11/2002 | Lin et al. | | |
| 2004/0130631 A1 | 7/2004 | Suh | | |
| 2009/0196475 A1 | 8/2009 | Demirli et al. | | |

FOREIGN PATENT DOCUMENTS

| | | |
|---|---|---|
| CN | 103268475 A | 8/2013 |
| CN | 103927719 A | 7/2014 |
| CN | 104008534 A | 8/2014 |
| CN | 104318262 A | 1/2015 |
| CN | 104637030 A | 5/2015 |
| JP | 2000242775 A | 9/2000 |

* cited by examiner

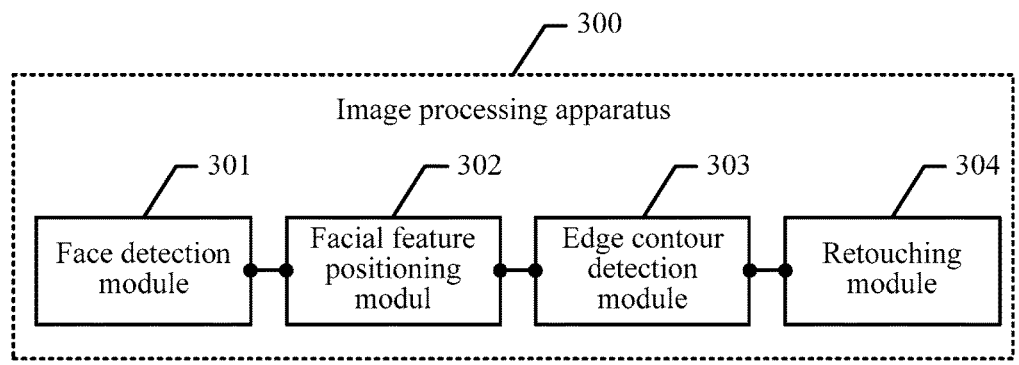
FIG. 3-a
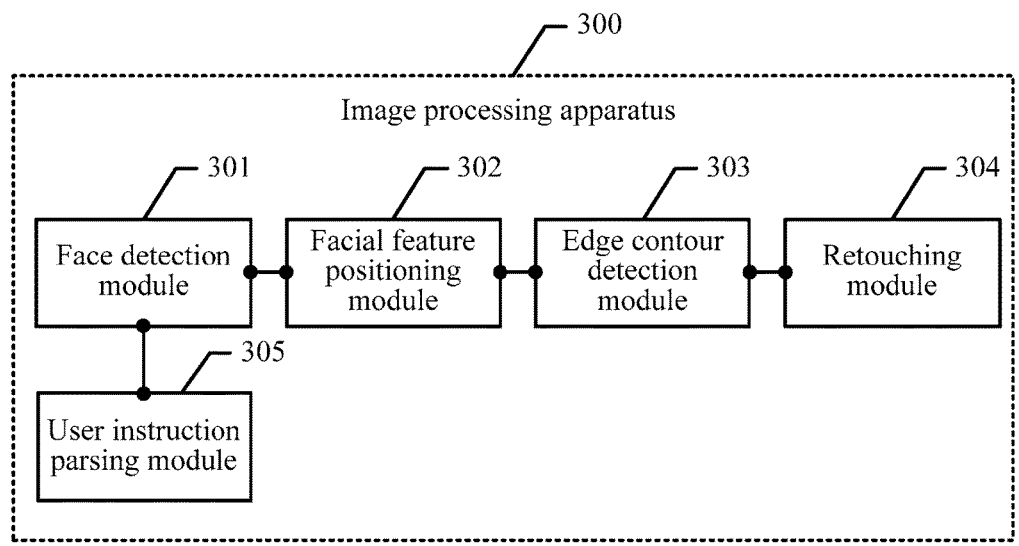
FIG. 3-b

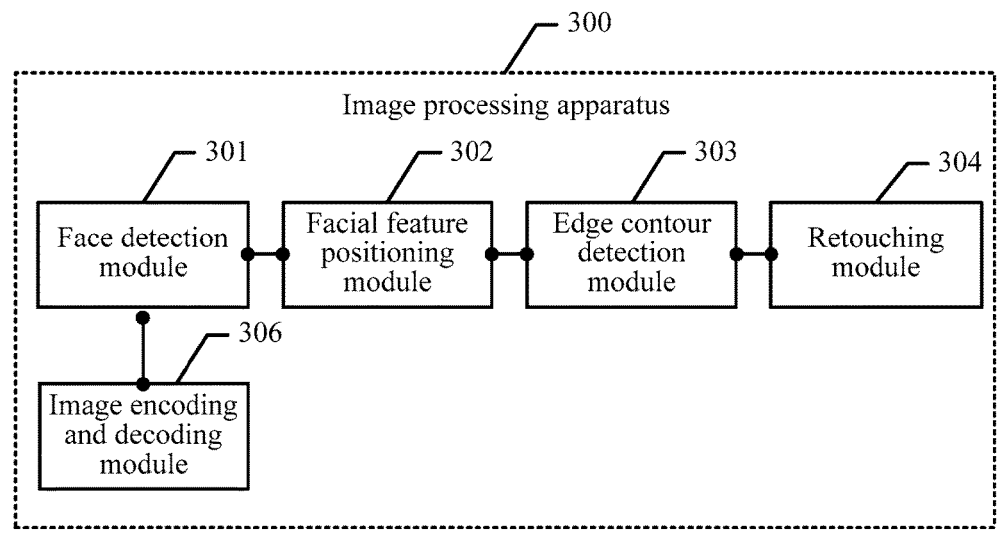
FIG. 3-c
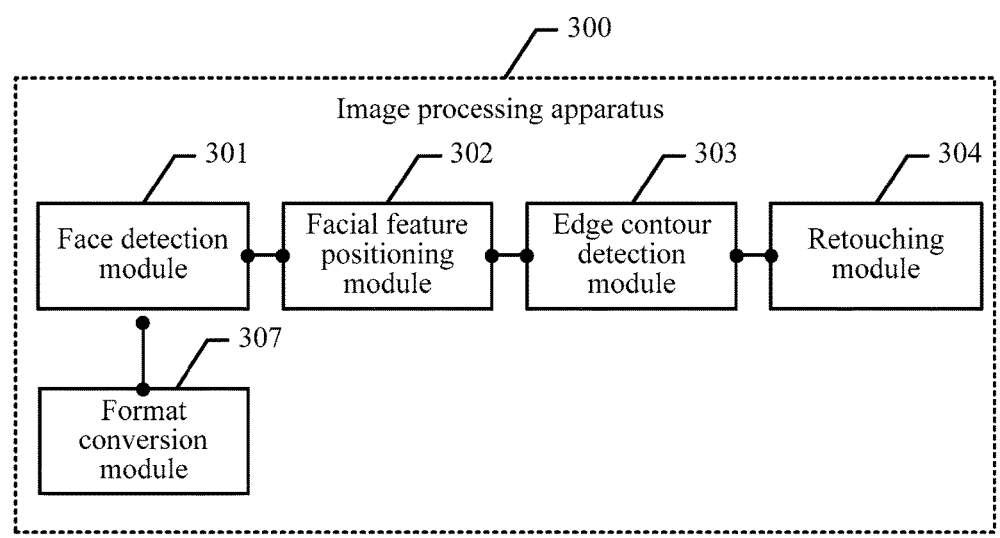
FIG. 3-d

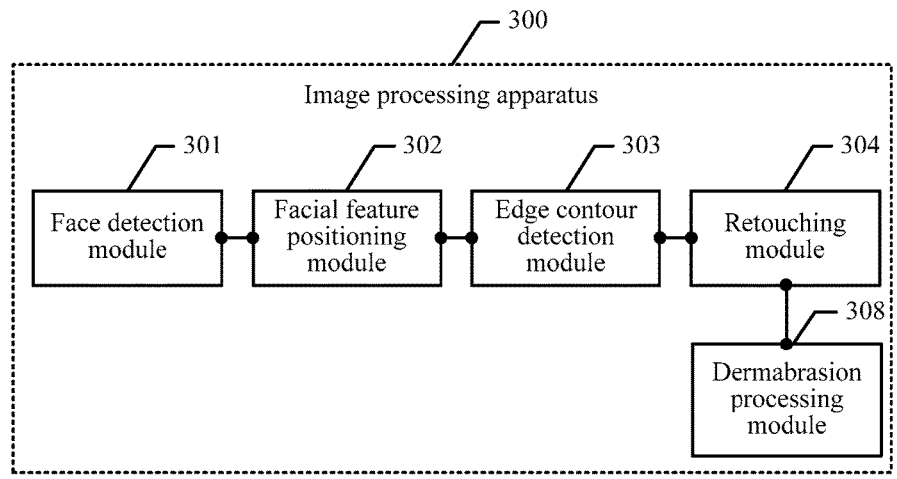
FIG. 3-e
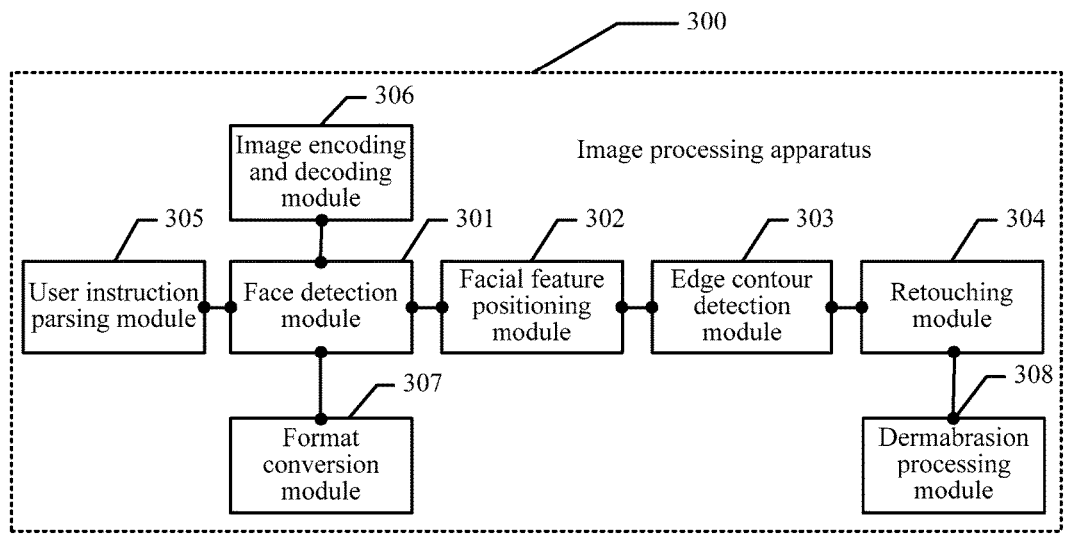
FIG. 3-f

IMAGE PROCESSING METHOD AND IMAGE PROCESSING APPARATUS

RELATED APPLICATIONS

This application is a continuation-in-part application of PCT/CN2016/097356, entitled "PICTURE PROCESSING METHOD AND DEVICE" filed on Aug. 30, 2016, which claims priority to Chinese Patent Application No. 201510631783.8, filed with the State Intellectual Property Office of the People's Republic of China on Sep. 29, 2015, and entitled "IMAGE PROCESSING METHOD AND IMAGE PROCESSING APPARATUS", both of which are incorporated herein by reference in their entirety.

FIELD OF THE TECHNOLOGY

The present disclosure relates to the field of computer technologies, and in particular, to an image processing method and an image processing apparatus.

BACKGROUND OF THE DISCLOSURE

Currently, with the popularization of intelligent terminals such as a digital camera, a mobile phone, and a camera, there are more images, especially photos. Many people have pimples or speckles on their skins. In this way, pimples or speckles exist in photographed photos. Therefore, there is an important requirement for removing pimples or speckles in photos.

SUMMARY

Currently, a user may adjust and beautify a picture, especially a facial photo, for example, remove pimples, speckles, moles, and the like in the picture. However, this existing adjustment and beautifying operation usually requires manual repairing by means of professional image processing software, has many operation steps, and is not sufficiently convenient and fast. In this way, how to reduce user operations and more intelligently and fast remove pimples or speckles in a face in a digital picture becomes a problem that needs to be immediately resolved.

In some cases, a user may adjust and beautify a picture, especially a facial photo, for example, remove pimples, speckles, moles, and the like in the picture. However, this adjustment and beautifying operation usually requires manual repairing by means of professional image processing software, has many operation steps, and is not sufficiently convenient and fast. In this way, how to reduce user operations and more intelligently and fast remove pimples or speckles in a face in a digital picture becomes a problem that needs to be immediately resolved.

Embodiments of the present technology provide an image processing method and an image processing apparatus, configured to automatically remove, from a face in a photographic image, pixels that do not need to be presented in the image, such as pimples, speckles, and moles, thereby implementing automatic retouching on a facial image.

To resolve the foregoing technical problem, the embodiments of the present technology provide the following technical solutions:

According to a first aspect, an embodiment of the present technology provides an image processing method, including:

obtaining an image photographed by a camera, and performing face detection on the image by using a face detection algorithm, to obtain a face pixel set from the image, the face pixel set including: a plurality of pixels (e.g., all or substantially all) within an image area belonging to a face in the image;

positioning a facial feature contour mask over the face pixel set, to obtain a to-be-examined pixel set from the face pixel set, the to-be-examined pixel set including: a plurality of pixels (e.g., all or substantially all pixels) within the image area except pixels masked by the facial feature contour mask of the face in the face pixel set;

performing edge contour detection on the to-be-examined pixel set, and extracting one or more blemish regions (e.g., one or more regions with singly-connected contours) from the to-be-examined pixel set, to obtain a to-be-retouched pixel set, the to-be-retouched pixel set including: a plurality of pixels (e.g., all or substantially all pixels) within an image area belonging to the singly-connected contour; and retouching a plurality of pixels (e.g., all or substantially all pixels) in the to-be-retouched pixel set, to obtain a retouched pixel set.

According to a second aspect, an embodiment of the present technology further provides an image processing apparatus, including:

a face detection module, configured to: obtain an image photographed by a camera, and perform face detection on the image by using a face detection algorithm, to obtain a face pixel set from the image, the face pixel set including: a plurality of pixels (e.g., all or substantially all) within an image area belonging to a face in the image;

a facial feature positioning module, configured to: position a facial feature contour mask over the face pixel set, to obtain a to-be-examined pixel set from the face pixel set, the to-be-examined pixel set including: a plurality of pixels (e.g., all or substantially all) within an image area except the pixels masked by the facial feature contour mask of the face in the face pixel set;

an edge contour detection module, configured to: perform edge contour detection on the to-be-examined pixel set, and extract one or more blemish regions (e.g., one or more regions with singly-connected contours) from the to-be-examined pixel set, to obtain a to-be-retouched pixel set, the to-be-retouched pixel set including: a plurality of pixels (e.g., all or substantially all) within an image area belonging to the singly-connected contour; and a retouching module, configured to: retouch a plurality of pixels (e.g., all or substantially all) in the to-be-retouched pixel set, to obtain a retouched pixel set.

It can be seen from the foregoing technical solutions that the embodiments of the present technology has the following advantages:

In the embodiments of the present technology, an image photographed by a camera is first obtained, and face detection is performed on the image by using a face detection algorithm, to obtain a face pixel set from the image, the face pixel set including: a plurality of pixels (e.g., all or substantially all) within an image area belonging to a face in the image. Then, a facial feature contour mask is positioned over the face pixel set, to obtain a to-be-examined pixel set from the face pixel set, the to-be-examined pixel set including: a plurality of pixels (e.g., all or substantially all) within an image area except the pixels masked by the facial feature contour mask of the face in the face pixel set. Afterwards, edge contour detection is performed on the to-be-examined pixel set, and one or more blemish regions (e.g., one or more regions with singly-connected contours) is extracted from the to-be-examined pixel set, to obtain a to-be-retouched pixel set, the to-be-retouched pixel set including: a plurality of pixels (e.g., all or substantially all) within an image area belonging to the singly-connected contour. At last, a plurality of pixels (e.g., all or substantially all) in the to-be-retouched pixel set are extracted, to obtain a retouched pixel set. In the embodiments of the present technology, face detection, facial feature contour mask positioning, and edge contour detection may be automatically performed on the image; then the to-be-retouched pixel set is determined; a plurality of pixels (e.g., all or substantially all) in the to-be-retouched pixel set are retouched. In this way, automatic beautifying processing is accomplished on a facial image. A user does not want that pimples, speckles, moles, and the like that are presented in the image can all be automatically divided into the to-be-retouched pixel set, so that pixels that do not need to be presented in the image, such as pimples, speckles, and moles, can be automatically removed from a face, thereby implementing automatic retouching on the facial image.

BRIEF DESCRIPTION OF THE DRAWINGS

To describe the technical solutions in the embodiments of the present technology more clearly, the following briefly introduces the accompanying drawings required for describing the embodiments. Apparently, the accompanying drawings in the following description show merely some embodiments of the present technology, and a person of ordinary skill in the art may still derive other drawings from these accompanying drawings.

FIG. 3-*a* is a schematic compositional diagram of an image processing apparatus according to an embodiment of the present technology;

FIG. 3-*b* is a schematic compositional diagram of an image processing apparatus according to an embodiment of the present technology;

FIG. 3-*c* is a schematic compositional diagram of an image processing apparatus according to an embodiment of the present technology;

FIG. 3-*d* is a schematic compositional diagram of an image processing apparatus according to an embodiment of the present technology;

FIG. 3-*e* is a schematic compositional diagram of an image processing apparatus according to an embodiment of the present technology;

FIG. 3-*f* is a schematic compositional diagram of an image processing apparatus according to an embodiment of the present technology.

DESCRIPTION OF EMBODIMENTS

The embodiments of the present technology provide an image processing method and an image processing apparatus, configured to automatically correct pixels corresponding to pimples, speckles, moles, and the like on a face in an image, thereby implementing automatic retouching on a facial image.

To make the technology objectives, features, and advantages of the present technology clearer and more comprehensible, the following clearly and completely describes the technical solutions in the embodiments of the present technology with reference to the accompanying drawings in the embodiments of the present technology. Apparently, the embodiments described in the following are merely a part rather than all of the embodiments of the present technology. All other embodiments obtained by a person skilled in the art based on the embodiments of the present technology shall fall within the protection scope of the present technology.

In the specification, claims, and accompanying drawings of the present technology, the terms "include", "contain" and any other variants mean to cover the non-exclusive inclusion.

Detailed descriptions are provided in the following.

Figure 1:
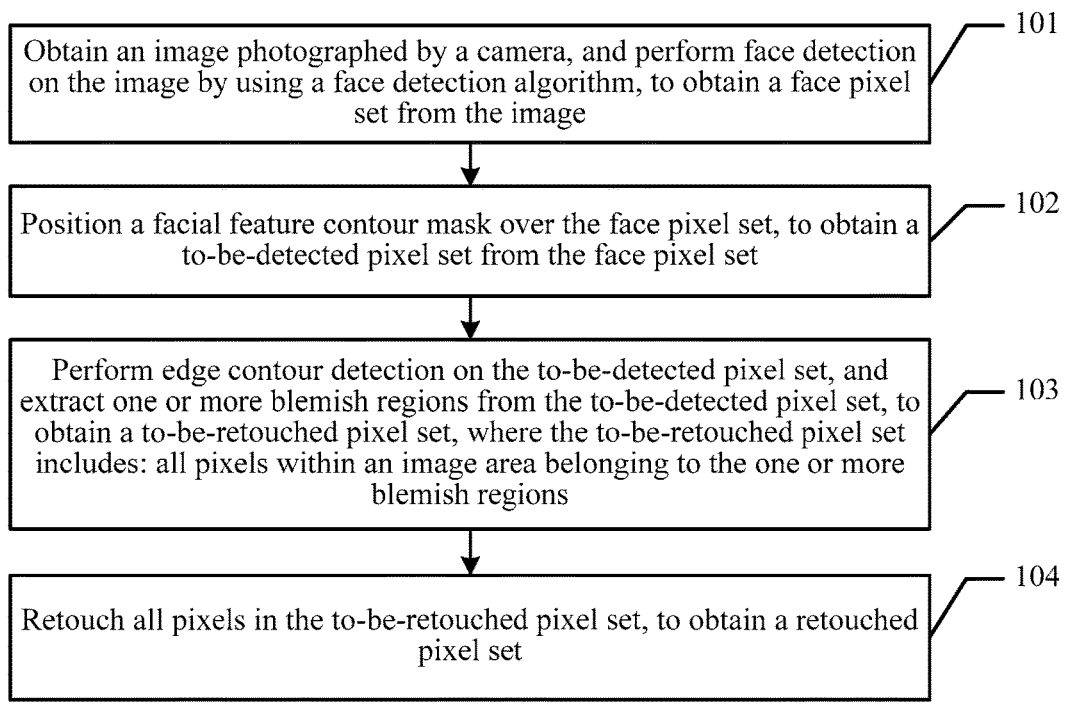
FIG. 1 is a schematic block flowchart of an image processing method according to an embodiment of the present technology.

An embodiment of an image processing method of the present technology may be specifically applied to performing automatic beautifying processing on an image photographed by a camera. Referring to FIG. 1, an image processing method provided by an embodiment of the present technology may include the following steps:

101: Obtain an image photographed by a camera, and perform face detection on the image by using a face detection algorithm, to obtain a face pixel set from the image.

The face pixel set includes: a plurality of pixels (e.g., all or substantially all pixels) within an image area belonging to a face detected in the image.

In this embodiment of the present technology, an image processing apparatus may be disposed in a user terminal in which the camera is installed. The image processing apparatus may obtain from a display cache of the terminal the image photographed by the camera. When the camera in the user terminal photographs images, the camera photographs frames appearing in a lens, and a generated image is saved in the display cache. The image processing apparatus may detect whether the image photographed by the camera is stored in the display cache. After the image photographed by the camera in the display cache is detected, the image processing apparatus automatically obtains the image photographed by the camera. In this way, after photographing the face and obtaining the image, the camera may automatically obtain the image photographed by the camera and perform face detection on the image, then perform facial feature contour mask positioning and edge contour detection that are mentioned in the following, and determine a to-be-retouched pixel set. After retouching a plurality of pixels (e.g., all or substantially all pixels) in the to-be-retouched pixel set, the camera may accomplish automatic beautifying processing on the facial image.

In addition, the image processing apparatus may not include the camera. The image processing apparatus may obtain a to-be-processed image from another device, or obtain a to-be-processed image by using a network. When a particular image is selected, or the image processing apparatus detects that an image is stored in a particular storage space, the image processing apparatus obtains the image.

Then, the image processing apparatus performs face detection on the image by using a preset face detection algorithm, to obtain a face pixel set from the image. The preset face detection algorithm may be implemented by processing the image by using a face classifier, to determine whether there is a face in the image. Alternatively, the face detection algorithm may be implemented by using adaboost in an Opencv tool.

In this embodiment of the present technology, the image is detected by using the face detection algorithm. If a face is successfully detected from the image, the face pixel set is obtained from the image. The face pixel set may include: a plurality of pixels (e.g., all or substantially all pixels) within an image area belonging to a face detected in the image. If a face cannot be detected from the image, the image processing apparatus may prompt, by using a user interface (UI) display sub-system in the terminal, to a user that no face is detected. In this case, the user needs to photograph again.

In an implementation, before step 101: Obtain an image photographed by a camera, and perform face detection on the image by using a face detection algorithm, to obtain a face pixel set from the image, the image processing method further includes:

A1: Detect an operation instruction that is inputted by a user by using a UI display sub-system.

A2: If the operation instruction instructs to perform beautifying processing on the image photographed by the camera, trigger to perform step 101: Obtain an image photographed by a camera, and perform face detection on the image by using a face detection algorithm, to obtain a face pixel set from the image.

In an implementation, the UI display sub-system of the terminal may provide an automatic beautifying processing button to the user. If the user needs to perform automatic beautifying processing on the image, the user may operate the automatic beautifying processing button displayed on the UI display sub-system. The image processing apparatus performs detection by using an operation instruction inputted by the UI display sub-system. If the operation instruction instructs the automatic beautifying processing button to be selected by the user, step 101 and other steps after step 101 in this embodiment of the present technology start to be performed, to accomplish automatic beautifying processing on the image. In this embodiment of the present technology, an operation intend of the user is obtained by detecting the operation instruction inputted by the UI display sub-system, so that automatic beautifying processing is performed on the image according to the instruction of the user, thereby improving an intelligent degree of image beautifying processing of human-machine interaction.

It should be noted that in some embodiments of the present technology, the UI display sub-system may include: an image display interface module and a viewer action bar module. The image display interface module may be configured to display an image photographed by a camera and an image accomplished by beautifying processing. The viewer action bar module may be configured to display some operation buttons in a viewer window, for example, including the foregoing automatic beautifying processing button and also including a file selection button, a display control button, and the like. In addition, the UI display sub-system is mainly applied to an interface that is used for interacting between the image processing apparatus and the user and that is used for obtaining a control instruction of the user by using the UI display sub-system and outputting an image beautifying result to the user.

In an implementation, before step 101: Perform face detection on the image by using a face detection algorithm, to obtain a face pixel set from the image, the image processing method provided in this embodiment of the present technology further includes:

B1: Decode the image, to obtain an original image information flow.

B2: Encode the original image information flow, to obtain an image satisfying a preset format requirement.

In this embodiment of the present technology, formats of images photographed by cameras of different user terminals may of different types, and formats of directly photographed images may not be image formats that the user really needs. The image processing apparatus provided in this embodiment of the present technology may also encode and decode the image photographed by the camera. For example, the image photographed by the camera is first decoded, to obtain the original image information flow. The original image information flow may be picture information of an RGB pixel format, then the original image information flow is encoded according to an image format selected by the user, and the original image information flow is encoded into an image satisfying the preset format requirement. The user may select image formats such as BMP, JPG, PNG, and JPEG as image formats that the user needs.

102: Position a facial feature contour mask over the face pixel set, to obtain a to-be-examined pixel set from the face pixel set.

The to-be-examined pixel set includes: a plurality of pixels (e.g., all or substantially all) within the image area except the pixels masked by the facial feature contour mask of the face in the face pixel set.

In this embodiment of the present technology, after a facial picture is detected from the image, the face pixel set may be obtained. The face pixel set includes only a plurality of pixels (e.g., all or substantially all) belong to a facial part, and the face pixel set does not include other pixels beyond the facial contour. The face pixel set further includes, in addition to facial pixels of the face, facial feature pixels, and facial feature parts of the face usually does not need beautifying operations such as pimple, speckle, and mole removing. Therefore, step 102: Position a facial feature contour mask over the face pixel set, to obtain a to-be-examined pixel set from the face pixel set needs to be performed in this embodiment of the present technology, that is, the facial feature contour needs to be extracted from the face pixel set. Therefore, the image area except the pixels masked by the facial feature contour mask is the facial area of the face. Pixels that do not need to be presented in the image, such as pimples, speckles, and moles, may exist in the facial area. In this embodiment of the present technology, a plurality of pixels (e.g., all or substantially all) within the facial area of the face are defined to the to-be-examined pixel set. The to-be-examined pixel set may include: a plurality of pixels (e.g., all or substantially all) within an image area except the pixels masked by the facial feature contour mask of the face in the face pixel set.

It should be noted that in this embodiment of the present technology, when the facial feature contour mask is positioned over the face pixel set, a facial feature classifier, for example, may be used to detect facial feature positions in the face, to detect from the face pixel set contours at which eyes, eyebrows, a nose, a mouth, and ears are located. For another example, another facial feature positioning method may be used in this embodiment of the present technology, for example, Active Contour Model, Elastic Bunch Graph Matching, Active Shape Model (ASM), and Active Appearance Model (AAM).

103: Perform edge contour detection on the to-be-examined pixel set, and extract one or more blemish regions (e.g., one or more regions with singly-connected contours) from the to-be-examined pixel set, to obtain a to-be-retouched pixel set. The to-be-retouched pixel set includes: a plurality of pixels (e.g., all or substantially all) within an image area belonging to the singly-connected contour.

In this embodiment of the present technology, the to-be-examined pixel set includes a plurality of pixels (e.g., all or substantially all) that belong to the face but do not belong to a facial image area of the facial feature contour mask. The to-be-examined pixel set includes facial picture pixels belong to the face, and pixels that do not need to be presented in the image, such as pimples, speckles, and moles, most likely appear in the face. These pimples, speckles, moles, and the like are usually represented as small singly-connected areas in the image of the face. Therefore, in this embodiment of the present technology, edge contour detection may be performed on the to-be-examined pixel set, to detect all singly-connected contours in the to-be-examined pixel set. After the singly-connected contours are extracted from the to-be-examined pixel set, pixels within all singly-connected areas in the to-be-examined pixel set may compose the to-be-retouched pixel sets. Pixels included in these to-be-retouched pixel sets are represented as pixels that do not need to be presented in the image, such as pimples, speckles, and moles. In this embodiment of the present technology, pimples, speckles, and moles in the facial image may be automatically positioned by using step 103, and specific positions of pimples, speckles, moles, and the like do not need to be manually searched by using graphic processing software. For the user, this greatly lowers an operation threshold of image beautifying processing and implements an automatic operation on image beautifying processing.

It should be noted that in an implementation, before step 101: Perform face detection on the image by using a face detection algorithm, to obtain a face pixel set from the image, the image processing method provided in this embodiment of the present technology further includes:

C1: Perform format conversion on the image, to obtain an image satisfying a YCrCb format requirement, where each pixel in the face pixel set is a pixel including a Y component, a Cr component, and a Cb component, and each pixel in the to-be-examined pixel set is a pixel including a Y component, a Cr component, and a Cb component.

After obtaining the image photographed by the camera, the image processing apparatus may perform format conversion on the image, to obtain an image satisfying the YCrCb format requirement. The image is converted into a YCrCb format so that the facial image area in the image can be further detected in subsequent steps. After the format of the image is converted into the YCrCb format, each pixel in the face pixel set in step 101 is a pixel including a Y component, a Cr component, and a Cb component, and each pixel in the to-be-examined pixel set in step 102 is a pixel including a Y component, a Cr component, and a Cb component. In this case, in some embodiments of the present technology, step 103: Perform edge contour detection on the to-be-examined pixel set, and extract one or more blemish regions (e.g., one or more regions with singly-connected contours) from the to-be-examined pixel set, to obtain a to-be-retouched pixel set may specifically include the following steps:

D1: Perform image binarization processing on the to-be-examined pixel set by using a global adaptive threshold obtained by OTSU.

D2: Remove a pixel whose Cr component has a value of 0 from the to-be-examined pixel set on which image binarization processing has been performed, to obtain an edge contour pixel set.

D3: Perform a face grayscale image convolution operation on the edge contour pixel set by using a preset differential Gaussian kernel, to obtain the edge contour pixel set on which the face grayscale image convolution operation has been accomplished.

D4: Search, by using a preset contour searching function, the singly-connected contour from the edge contour pixel set on which the face grayscale image convolution operation has been accomplished, so that the singly-connected contour obtains the to-be-retouched pixel set.

In this embodiment of the present technology, if the format of the image is the YCrCb format, each pixel in the to-be-examined pixel set is a pixel including a Y component, a Cr component, and a Cb component. Image binarization processing is performed on the to-be-examined pixel set by using a global adaptive threshold. Image binarization is setting a grayscale value of a pixel on the picture to 0 or 255, that is, the entire picture presents obvious black and white effects. In the to-be-examined pixel set on which image binarization processing has been formed, for a pixel belonging to complexion of the face, a Cr component of the pixel has a value of 0. Therefore, pixels whose Cr components have a value of 0 do not belong to pimples, speckles, moles, and the like. A beautifying operation does not need to be performed on these pixels whose Cr components have a value of 0. The pixels whose Cr components have a value of 0 are removed from the to-be-examined pixel set on which image binarization processing has been performed, to obtain the edge contour pixel set. The edge contour pixel set includes an image area that may be a pimple, a speckle, or a mole. Then a face grayscale image convolution operation is performed on the edge contour pixel set by using a preset differential Gaussian kernel, to obtain the edge contour pixel set on which the face grayscale image convolution operation has been accomplished. The differential Gaussian kernel may be set according to a size of a color pimple that needs to be removed in an actual application scenario. For example, the differential Gaussian kernel may be set to a 7*7 matrix. In another scenario, the differential Gaussian kernel may be set to a 6*6 matrix. Refer to the existing technology for values of elements of the matrix of the differential Gaussian kernel. Details are not provided herein. In addition, settings of a specific operation manner of the face grayscale image convolution operation and operators may use an existing operation manner of a face grayscale picture.

In step D4, the singly-connected contour is searched, by using the preset contour searching function, from the edge contour pixel set on which the face grayscale image convolution operation has been accomplished. Each singly-connected contour that is found in the edge contour pixel set on which the face grayscale image convolution operation has been accomplished indicates that there is a pimple, speckle, or mole on the face. Pixels within the singly-connected contour are pixels that need to be retouched. Pixels within all singly-connected areas in the edge contour pixel set on which the face grayscale image convolution operation has been accomplished may compose the to-be-retouched pixel sets. Pixels included in these to-be-retouched pixel sets are pixels that do not need to be presented in the image, such as pimples, speckles, or moles. It should be noted that in step D4, the singly-connected contour may be found by using a contour searching function provided in an Opencv tool. Refer to the existing technology for specific software execution code of the contour searching function.

104: Retouch a plurality of pixels (e.g., all or substantially all) in the to-be-retouched pixel set, to obtain a retouched pixel set.

In this embodiment of the present technology, according to step 103, the to-be-retouched pixel set is automatically determined. The to-be-retouched pixel set includes picture pixels on which beautifying operation needs to be performed. Then, step 104: Retouch a plurality of pixels (e.g., all or substantially all) in the to-be-retouched pixel set, to obtain a retouched pixel set is performed. A retouching operation that is performed on the to-be-retouched pixel set refers to changing values of pixels within the singly-connected area in the to-be-retouched pixel set, so that values of pixels within the singly-connected area are changed to values of pixels within a normal facial area of the face, that is, are changed to values of pixels beyond the to-be-retouched pixel set in the to-be-examined pixel set, so that pixels that do not need to be presented in the image, such as pimples, speckles, or moles. After the retouched pixel set is obtained, the retouched pixel set then combines with all other pixels beyond to-be-retouched pixel set in the original image so that a complete retouched image may be composed. Elements that do not need to be presented in the image, such as pimples, speckles, or moles are automatically removed from the retouched images, so that a photo looks more beautiful, satisfying a requirement of the user on an image automatic beautifying operation.

In an implementation, after step 104: Retouch a plurality of pixels (e.g., all or substantially all) in the to-be-retouched pixel set, to obtain a retouched pixel set, the image processing method provided in this embodiment of the present technology further includes:

E1: Perform Gaussian blur on the image including the retouched pixel set according to a preset blur radius.

E2: Output the image on which Gaussian blur has been accomplished to the UI display sub-system.

After step 104 is performed, in this embodiment of the present technology, the image including the retouched pixel set may be obtained. That is, according to specific descriptions in the foregoing content, automatic retouching may be performed on pixels of image areas such as pimples, speckles, and moles appearing in the face pixel set. The retouched pixels are added with pixels that do not need to be retouched in the original image so that a complete facial image may be composed. Elements that do not expect to be presented, such as pimples, speckles, and moles, and that may appear in the facial image are retouched, and the outputted retouched image achieves an effect of no track and presents a clean skin. In addition, to further beautify the image, a dermabrasion operation may be performed on the image. For example, Gaussian blur may also be performed on the image. The used blur radius may be set in advance. After the image including the retouched pixel set is completely outputted in step 104, Gaussian blur may be performed on the image by using a preset blur radius, and the image on which Gaussian blur has been accomplished is outputted to the UI display sub-system. It can be known from the foregoing content that the UI display sub-system may include an image display interface module, the image display interface module may be configured to display the retouched image, and the user may operate the terminal to browse the retouched image.

It can be known from the foregoing descriptions of the foregoing embodiment about the embodiments of the present technology that an image photographed by a camera is first obtained, and face detection is performed on the image by using a face detection algorithm, to obtain a face pixel set from the image, the face pixel set including: a plurality of pixels (e.g., all or substantially all) within an image area belonging to a face in the image; then, a facial feature contour mask is positioned over the face pixel set, to obtain a to-be-examined pixel set from the face pixel set, the to-be-examined pixel set including: a plurality of pixels (e.g., all or substantially all) within an image area except the facial feature contour of the face in the face pixel set; afterwards, edge contour detection is performed on the to-be-examined pixel set, and one or more blemish regions (e.g., one or more regions with singly-connected contours) is extracted from the to-be-examined pixel set, to obtain a to-be-retouched pixel set, the to-be-retouched pixel set including: a plurality of pixels (e.g., all or substantially all) within an image area belonging to the singly-connected contour; at last, a plurality of pixels (e.g., all or substantially all) in the to-be-retouched pixel set are extracted, to obtain a retouched pixel set. In the embodiments of the present technology, face detection, facial feature contour mask positioning, and edge contour detection may be automatically performed on the image; then the to-be-retouched pixel set is determined; a plurality of pixels (e.g., all or substantially all) in the to-be-retouched pixel set are retouched. In this way, automatic beautifying processing is accomplished on a facial image. A user does not want that pimples, speckles, moles, and the like that are presented in the image can all be automatically divided into the to-be-retouched pixel set, so that pixels that do not need to be presented in the image, such as pimples, speckles, and moles, can be automatically removed from a face, thereby implementing automatic retouching on the facial image.

To better understand and implement the foregoing solutions of this embodiment of the present technology, specific descriptions are provided below by using corresponding application scenarios as an example.

The image processing method provided in this embodiment of the present technology may be used for implementing a function of automatic pimple removal, thereby beautifying a portrait photo. In this embodiment of the present technology, a position of a small pimple of a face in an image may be intelligently detected. The pimple in the face in the image is fixed, thereby achieving an effect of no track. A photo on which pimple removal has been performed presents a clean skin and has a natural display effect, to bring better experience and effects for viewing and processing the image by the user. In many scenarios such as self portraits, life photos, art photos, and wedding photos, the image processing method provided in this embodiment of the present technology has a specific and practical application requirement.

Figure 2:
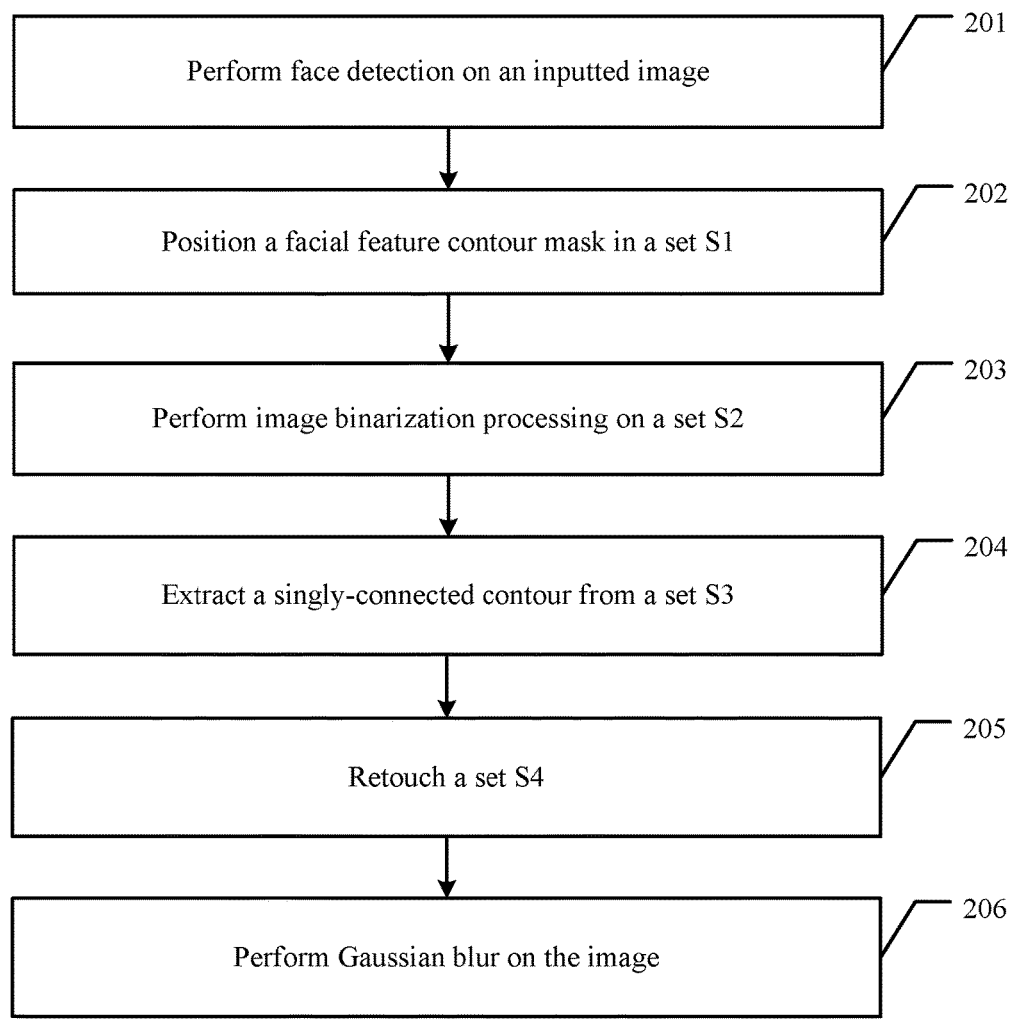
FIG. 2 is a schematic system processing flowchart of an image processing method according to an embodiment of the present technology.

That this embodiment of the present technology can implement automatic pimple removal, thereby beautifying a portrait photo is described below in detail by using examples. Referring to FIG. 2, FIG. 2 is a schematic system processing flowchart of an image processing method according to an embodiment of the present technology.

Step 201: Perform face detection on an inputted image by using a face detection algorithm; and if face detection fails, prompt a user to re-input the image. The face pixel set obtained from the image is marked as a set S1.

Step 202: Position a facial feature contour mask in the set S1, to obtain the facial feature contour of a face; remove pixels representing facial features of the face from the set S1 according to the facial feature contour, to obtain a to-be-examined pixel set, where the to-be-examined pixel set is marked as S2, and S2 includes a set of a plurality of pixels (e.g., all or substantially all) that are within the facial contour but not within eyes, eyebrows, a nose, a mouth, and ears.

Step 203: Convert a facial picture to YCrCb space; perform image binarization processing on a Cr component of each pixel in the set S2 by using a global adaptive threshold obtained by OTSU; and remove from the set S2 pixels whose Cr components on which binarization has been performed are 0, to obtain an edge contour pixel set, where the edge contour pixel set is marked as a set S3.

Step 204: Perform a face grayscale image convolution operation on each pixel in the set S3 according to the following differential Gaussian kernel; and search, by using a contour searching function (for example, cv::findContours) of an opencv tool, all singly-connected contours in the set S3 from the set S3 on which the face grayscale image convolution operation has been accomplished, where pixels whose contour areas are less than 50 are reserved, and 80% of pixels are within the singly-connected contour of the set S3; a plurality of pixels (e.g., all or substantially all) within the singly-connected contour compose a to-be-retouched pixel set, and the to-be-retouched pixel set is marked as a set S4. Kernel7 represents a 7*7 differential Gaussian kernel, and the differential Gaussian kernel may have a very good detection effect for a color pimple of a size of 7*7.

$$\text{kernel7[ ]} = \begin{Bmatrix} 0.0064, & 0.0062, & 0.0050, & 0.0043, & 0.0050, & 0.0062, & 0.0064, \\ 0.0062, & 0.0033, & -0.0014, & -0.0037, & -0.0014, & 0.0033, & 0.0062, \\ 0.0050, & -0.0014, & -0.0103, & -0.0147, & -0.0103, & -0.0014, & 0.0050, \\ 0.0043, & -0.0037, & -0.0147, & -0.0200, & -0.0147, & -0.0037, & 0.0043, \\ 0.0050, & -0.0014, & -0.0103, & -0.0147, & -0.0103, & -0.0014, & 0.0050, \\ 0.0062, & 0.0033, & -0.0014, & -0.0037, & -0.0014, & 0.0033, & 0.0062, \\ 0.0064, & 0.0062, & 0.0050, & 0.0043, & 0.0050, & 0.0062, & 0.0064 \end{Bmatrix}.$$

Step 205: For the set S4 determined in step 204, retouch a facial image by using an inpaint retouching function of an opencv tool.

Step 206: Perform 3*3 Gaussian blur on the retouched image, and display a final result to an image display interface module.

It can be known from the foregoing descriptions about examples of the present disclosure that the present disclosure may intelligently detect the position of a small pimple in the face in the image and fix the pimple in the face in the image, achieving an effect of no track. A photo on which pimple removal has been performed presents a clean skin. A natural effect can be obtained by using a beatifying means such as dermabrasion. A character becomes beautiful accordingly, and an abnormal effect cannot be introduced. It has a specific and practical application in many scenarios such as self portraits, life photos, art photos, and wedding photos.

Based on the above techniques, in some embodiments, a method of processing images is performed by an electronic device with one or more processors and memory, and optionally, a camera that is configured to capture photo images. In some embodiments, the device obtains an image photographed by a camera (e.g., by intercepting the output of the camera when the shutter of the camera is operated and before the photo is presented to the user, or retrieving an existing photo from a photo library). In some embodiments, instead of obtaining an image photographed by a camera, the device, or continuously receiving an image preview from the camera and perform the image processing method as described herein and present the processed image as the preview image to the user, such that the user can see the beautified images before pressing the shutter to actually capture or save the image. The device performs face detection on the image (the captured image or the preview image from the camera) by using a face detection algorithm, to obtain a face pixel set from the image, the face pixel set comprising: a plurality of pixels within an image area belonging to a face detected in the image.

The device positions a facial feature contour mask over the face pixel set, to obtain a to-be-examined pixel set from the face pixel set, the to-be-examined pixel set comprising: a plurality of pixels within an image area except pixels masked by the facial feature contour mask in the face pixel set. In some embodiments, the facial feature contour mask is a collection of disconnected mask regions corresponding to different facial features, such as eyebrows, eyes, nose, mouth, ear, hairline, mustaches, beard, etc. In some embodiments, the facial feature contour mask is an opaque area for each feature. In some embodiments, the facial feature contour mask includes only boundary lines around the contours of the facial features. For example, with respect to the nose region, the facial feature contour mask only includes the outlines of the nose, and the skin region of the nose is not masked, such that blemishes on the nose are still included in the to-be-examined pixel set. For the eyes and eye brows, the facial feature contour mask include opaque regions covering the entire eyes and eye brows. In some embodiments, the user provide input to choose the components of the facial feature contour mask that is used, for example, the user make choose from a set of eye brow shapes, eye shapes, mouth shapes, and nose shapes to fit the user's particular appearance, or makeup style. In some embodiments, the facial features are automatically identified from the image and removed from the to-be-examined pixel set.

In some embodiments, before the processing continues, after the face detection is completed, the device determines whether the size of the face passes a predefined size threshold. In accordance with a determination that the face size of the detected face does not meet a predefined size threshold (e.g., too small), the device forgoes the subsequent steps to detect or mask the facial features and removing the blemishes, instead, the device prompts the user to retake the photo. In accordance with a determination that the size meets the predefined size threshold, the processing continues as described herein. In some embodiments, when a face is detected, the device further determines if the face is a complete face or a portion of a face with all the facial features (e.g., two eyes, two eye brows, one nose, one mouth, etc.). In some embodiments, the facial feature contour mask is used only if a complete face is detected within the image. In some embodiments, in accordance with a determination that only a portion of the face is detected within the image, the device prompts the user to identify the facial features, e.g., one eye brow, one eye, and a side view of a nose without nostrils being within the imaged area, etc. Once the user has identified the facial features present in the image, the device generates a partial facial feature mask based on the facial features that are actually present in the image. In some embodiments, the device automatically detects the facial features present in the image when the full face is present in the image, and tracks the facial features as the user's face moves such that when some of the facial features are no longer in the image, the device still maintains the information regarding which facial features are still within the image, and generates the partial facial feature mask accordingly. In some embodiments, the device presents the facial feature contour mask over the face in the image and allows the user to provide inputs to adjust the different portions of the facial feature contour mask, e.g., adjusting the positions, orientations, shapes, and sizes of the eye brows, eyes, nose, ears, hairline, facial hair, mouth, etc. In some embodiments, the inputs are touch inputs, e.g., the user may select a feature and drag the feature as a whole to reposition or rotate it, or drag a contour line to reshape and resize the feature. In some embodiments, the user may use simple text input, or voice input to make simple adjustments, such as "move left eye brow up" "continue to move up", "move mouth a little leftward," etc. In some embodiments, the device provides the input means (e.g., a text input box) on the user interface concurrently with the image and the current state of the mask. The text input and voice input is sometimes more convenient than the fine touch inputs required to drag and reshape/resize the facial feature contour, particularly when the user is moving. In some embodiments, the device automatically open the text/voice input interface in response to a determination that the device is in motion (e.g., when the user is walking, running, or on a moving vehicle).

The device then performs edge contour detection on the to-be-examined pixel set. The device extracts one or more blemish regions from the to-be-examined pixel set, to obtain a to-be-retouched pixel set, the to-be-retouched pixel set comprising: a plurality of pixels within an image area belonging to the one or more blemish regions. The device retouches all pixels in the to-be-retouched pixel set, to obtain a retouched pixel set.

In some embodiments, the device detects an operation instruction that is inputted by a user prior to photographing the image by the camera, wherein the operation instruction triggers a predefined beatifying processing function including the steps of the above processing. The device displaying the retouched pixel set to a user as an output from the camera. For example, the processing is performed, such that the original output of the camera is not shown to the user, instead the retouched image is presented to the user as the output of the camera.

In some embodiments, after displaying the retouched pixel set as the output from the camera, the device displays the image captured by the camera only in response to a request by a user. For example, an affordance is displayed over the retouched image, and in response to an input invoking the affordance, the device displays the original image from the camera, e.g., side by side to the retouched image. In some embodiments, a gesture input (e.g., a horizontal swipe on the face in the image) causes the face to be reverted to the original state in the original image before the retouching.

In some embodiments, the device detects an operation instruction that is inputted by a user after photographing the image by the camera, wherein the operation instruction triggers a predefined beatifying processing function including the steps of the above processing. The device then displays the retouched pixel set to a user in comparison to the image captured by the camera.

In some embodiments, before the performing face detection on the image by using the face detection algorithm, to obtain the face pixel set from the image, the device decodes the image, to obtain an original image information flow, and encodes the original image information flow, to obtain an image satisfying a preset format requirement. The encoding includes: performing format conversion on the image, to obtain an image satisfying a YCrCb format requirement, wherein each pixel in the face pixel set is a pixel comprising a Y component, a Cr component, and a Cb component, and each pixel in the to-be-examined pixel set is a pixel comprising a Y component, a Cr component, and a Cb component. In some embodiments, the performing edge contour detection on the to-be-examined pixel set, and extracting the one or more blemish regions from the to-be-examined pixel set, to obtain the to-be-retouched pixel set comprises: performing image binarization processing on the to-be-examined pixel set; removing one or more pixels whose Cr component has a value of 0 from the to-be-examined pixel set on which image binarization processing has been performed, to obtain an edge contour pixel set; performing a face grayscale image convolution operation on the edge contour pixel set to obtain the edge contour pixel set on which the face grayscale image convolution operation has been accomplished; and identifying the one or more blemish regions from the edge contour pixel set on which the face grayscale image convolution operation has been accomplished.

In some embodiments, the retouching the plurality of pixels in the to-be-retouched pixel set, to obtain the retouched pixel set comprises: changing pixel values of the plurality of pixels in the to-be-retouched pixel set to pixel values of pixels beyond the to-be-retouched pixel set in the to-be-examined pixel set.

In some embodiments, the device accepts user inputs adjusting the blemish discovery and removal processes set forth herein. For example, in some embodiments, the device allows the user to exempt a particular blemish region from being removed. For example, certain birthmarks, moles, beauty marks are essential parts of a person's facial characteristics, and the user may wish to keep them on the image, or only moderately modify them. In some embodiments, the device after identifying the blemish regions in the face, presents the identified blemish regions (e.g., with outlines or identifiers) on the image or in a list. The user may use text input, touch input, or voice input to specify which ones of the identified blemish regions should be processed differently using a different procedure from the other blemish regions (e.g., pimples, bruises, discoloration, scars, etc.). In some embodiments, the device allows the user to specify the position and type of the blemish region, such that the device can select a predefined processing method for that blemish region. For example, if the user specifies that the blemish region on the left cheek is a pimple, the device will remove the pimple. If the user specifies that the blemish region near the nose region are freckles, the device will use a filter to lighten the freckles but not totally remove them. If the user specifies that the blemish region on the chin is a beauty mark, the device will remove the beauty mark, and replace it with a smaller and/or fainter version of the beauty mark. If the user specifies that the blemish region is a temporary scar, the device will remove it or lighten it. If the user specifies that the blemish region is a permanent scar, the device will lighten it or enhance it, depending on the user's preset preference.

In some embodiments, the device presents different versions of the beautifying processes, and allows the user to pick and choose the processing done to different blemish regions from different versions. For example, the cheek region should be done in accordance with the processing method used in version 1 of the beautifying process, and the chin region should be done in accordance with the processing method in version 2 of the beautifying process, etc. In some embodiments, the device produces a combination processing result in the end in accordance with the user's input regarding which processing version fits each of the detected blemish regions. Some of the blemish regions may be left as is, with no change from the original image. Other details of the image processing method are disclosed in other portions of the disclosure, and are not repeated here. The feature discussed in any part of the disclosure may be reasonably combined with other features disclosed in other parts of the disclosure.

It should be noted that for simple descriptions, the foregoing method embodiments are stated as a series of action combinations. However, a person skilled in the art should know that the present disclosure is not limited to the sequence of the described actions. Therefore, according to the present disclosure, some steps may use another sequence or may be simultaneously performed. Secondly, a person skilled in the art should also know that the embodiments described in the specification are all exemplary, and involved actions and modules are not necessary for the present disclosure.

To better implement the foregoing solutions of this embodiment of the present technology, a relevant apparatus for implementing the solutions is also provided below.

Referring to FIG. 3-a, an image processing apparatus 300 provided by an embodiment of the present technology may include: a face detection module 301, a facial feature positioning module 302, an edge contour detection module 303, and a retouching module 304.

The face detection module 301 is configured to: obtain an image photographed by a camera, and perform face detection on the image by using a face detection algorithm, to obtain a face pixel set from the image, the face pixel set including: a plurality of pixels (e.g., all or substantially all) within an image area belonging to a face in the image.

The facial feature positioning module 302 is configured to: position a facial feature contour mask over the face pixel set, to obtain a to-be-examined pixel set from the face pixel set, the to-be-examined pixel set including: a plurality of pixels (e.g., all or substantially all) within an image area except the facial feature contour of the face in the face pixel set.

The edge contour detection module 303 is configured to: perform edge contour detection on the to-be-examined pixel set, and extract one or more blemish regions (e.g., one or more regions with singly-connected contours) from the to-be-examined pixel set, to obtain a to-be-retouched pixel set, the to-be-retouched pixel set including: a plurality of pixels (e.g., all or substantially all) within an image area belonging to the singly-connected contour.

The retouching module 304 is configured to: retouch a plurality of pixels (e.g., all or substantially all) in the to-be-retouched pixel set, to obtain a retouched pixel set.

In some embodiments of the present technology, referring to FIG. 3-b, the image processing apparatus 300 further includes: a user instruction parsing module 305, configured to: before the obtaining an image photographed by a camera, and performing face detection on the image by using a face detection algorithm by the face detection module 301, detect an operation instruction that is inputted by a user by using a user interface (UI) display sub-system; and trigger to execute the face detection module if the operation instruction instructs to perform beautifying processing on the image photographed by the camera.

In some embodiments of the present technology, referring to FIG. 3-c, the image processing apparatus 300 further includes: an image encoding and decoding module 306, configured to: before the performing face detection on the image by using a face detection algorithm by the face detection module 301, decode the image, to obtain an original image information flow; and encode the original image information flow, to obtain an image satisfying a preset format requirement.

In some embodiments of the present technology, referring to FIG. 3-d, the image processing apparatus 300 further includes: a format conversion module 307, configured to: before the performing face detection on the image by using a face detection algorithm, to obtain a face pixel set from the image by the face detection module 301, perform format conversion on the image, to obtain an image satisfying a YCrCb format requirement, where each pixel in the face pixel set is a pixel including a Y component, a Cr component, and a Cb component, and each pixel in the to-be-examined pixel set is a pixel including a Y component, a Cr component, and a Cb component.

In some embodiments of the present technology, the edge contour detection module 303 is specifically configured to: perform image binarization processing on the to-be-examined pixel set by using a global adaptive threshold obtained by OTSU; remove a pixel whose Cr component has a value of 0 from the to-be-examined pixel set on which image binarization processing has been performed, to obtain an edge contour pixel set; perform a face grayscale image convolution operation on the edge contour pixel set by using a preset differential Gaussian kernel, to obtain the edge contour pixel set on which the face grayscale image convolution operation has been accomplished; and search, by using a preset contour searching function, the singly-connected contour from the edge contour pixel set on which the face grayscale image convolution operation has been accomplished, so that the singly-connected contour obtains the to-be-retouched pixel set.

In some embodiments of the present technology, referring to FIG. 3-e, the image processing apparatus 300 further includes: a dermabrasion processing module 308, configured to: after the retouching a plurality of pixels (e.g., all or substantially all) in the to-be-retouched pixel set, to obtain a retouched pixel set by the retouching module 304, perform Gaussian blur on the image including the retouched pixel set according to a preset blur radius; and output the image on which Gaussian blur has been accomplished to the UI display sub-system.

In some embodiments of the present technology, referring to FIG. 3-f, the image processing apparatus 300 includes the face detection module 301, the facial feature positioning module 302, the edge contour detection module 303, the retouching module 304, the user instruction parsing module 305, the image encoding and decoding module 306, the format conversion module 307, and the dermabrasion processing module 308.

It can be known from the foregoing descriptions about the embodiments of the present technology that an image photographed by a camera is first obtained, and face detection is performed on the image by using a face detection algorithm, to obtain a face pixel set from the image, the face pixel set including: a plurality of pixels (e.g., all or substantially all) within an image area belonging to a face in the image; then, a facial feature contour in the face pixel set is positioned, to obtain a to-be-examined pixel set from the face pixel set, the to-be-examined pixel set including: a plurality of pixels (e.g., all or substantially all) within an image area except the facial feature contour of the face in the face pixel set; afterwards, edge contour detection is performed on the to-be-examined pixel set, and one or more blemish regions (e.g., one or more regions with singly-connected contours) is extracted from the to-be-examined pixel set, to obtain a to-be-retouched pixel set, the to-be-retouched pixel set including: a plurality of pixels (e.g., all or substantially all) within an image area belonging to the singly-connected contour; at last, a plurality of pixels (e.g., all or substantially all) in the to-be-retouched pixel set are extracted, to obtain a retouched pixel set. In the embodiments of the present technology, face detection, facial feature contour positioning, and edge contour detection may be automatically performed on the image; then the to-be-retouched pixel set is determined; a plurality of pixels (e.g., all or substantially all) in the to-be-retouched pixel set are retouched. In this way, automatic beautifying processing is accomplished on a facial image. A user does not want that pimples, speckles, moles, and the like that are presented in the image can all be automatically divided into the to-be-retouched pixel set, so that pixels that do not need to be presented in the image, such as pimples, speckles, and moles, can be automatically removed from a face, thereby implementing automatic retouching on the facial image.

Figure 4:
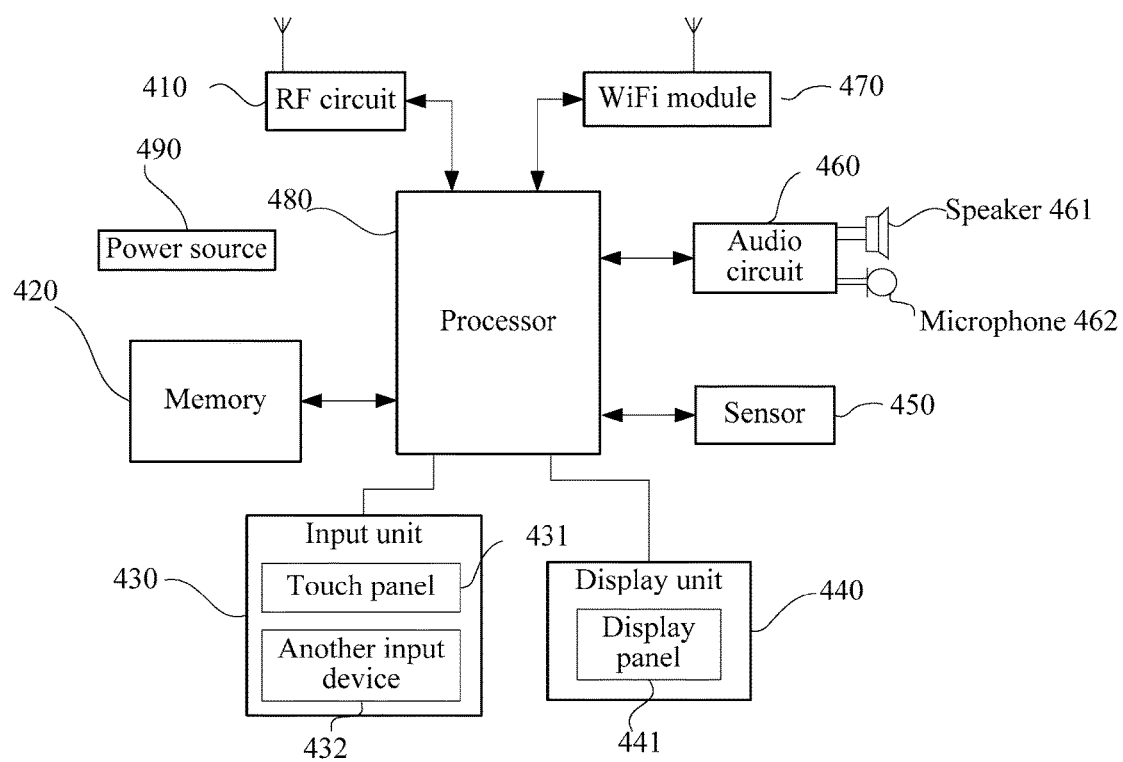
FIG. 4 is a schematic compositional diagram of a terminal to which an image processing method is applied according to an embodiment of the present technology.

An embodiment of the present technology further provides another terminal. As shown in FIG. 4, to facilitate description, FIG. 4 only shows a part relevant to this embodiment of the present technology, and specific technical details are not disclosed. Refer to a method part in the embodiments of the present technology. The terminal may be any terminal device such as a mobile phone, a tablet computer, a personal digital assistant (PDA), point of sales (POS), an in-vehicle computer. That the terminal is a mobile phone is used as an example:

FIG. 4 is a block diagram of the structure of a part of a mobile phone related to a terminal according to an embodiment of the present technology. Referring to FIG. 4, the mobile phone includes: components such as a radio frequency (RF) circuit 410, a memory 420, an input unit 430, a display unit 440, a sensor 450, an audio circuit 460, a wireless fidelity (WiFi) module 470, a processor 480, and a power source 490. A person skilled in the art would understand that the structure of the mobile phone shown in FIG. 4 does not constitute a limitation to the mobile phone, and the mobile phone may include more components or fewer components than those shown in the figure, or some components may be combined, or a different component deployment may be used.

The following specifically describes the components of the mobile phone with reference to FIG. 4.

The RF circuit 410 may be configured to receive and send a signal during an information receiving and sending process or a call process. Particularly, the RF circuit 410 receives downlink information from a base station, then delivers the downlink information to the processor 480 for processing, and sends related uplink data to the base station. Generally, the RF circuit 410 includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 420 may include a high speed random access memory, and may also include a non-volatile memory such as at least one magnetic disk storage device, a flash memory, or another volatile solid-state storage device.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may also be referred to as a touchscreen, may collect a touch operation of a user on or near the touch panel (such as an operation of a user on or near the touch panel 431 by using any suitable object or accessory such as a finger or a stylus), and drive a corresponding connection apparatus according to a preset program. Optionally, the touch panel 431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent from the processor 480. In addition, the touch panel 431 may be a resistive, capacitive, infrared, or surface sound wave type touch panel. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various menus of the mobile phone. The display unit 440 may include a display panel 441. Optionally, the display panel 641 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine the type of the touch event. Then, the processor 480 provides a corresponding visual output on the display panel 441 according to the type of the touch event. Although, in FIG. 4, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 460, a speaker 461, and a microphone 462 may provide audio interfaces between the user and the mobile phone. The audio circuit 460 may convert received audio data into an electric signal and transmit the electric signal to the speaker 461. The speaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another mobile phone by using the RF circuit 410, or outputs the audio data to the memory 420 for further processing.

WiFi belongs to a short distance wireless transmission technology. The mobile phone may help, by using the WiFi module 470, the user to receive and send emails, browse a web page, access streaming media, and so on, which provides wireless broadband Internet access for the user. Although FIG. 4 shows the WiFi module 470, it may be understood that the WiFi module 470 is not a necessary component of the mobile phone, and when required, the WiFi module 470 may be omitted as long as the scope of the essence of the present disclosure is not changed.

The processor 480 is the control center of the mobile phone, and is connected to various parts of the mobile phone by using various interfaces and lines. By running or executing the software program and/or module stored in the memory 420, and invoking data stored in the memory 420, the processor 480 performs various functions and data processing of the mobile phone, thereby performing overall monitoring on the mobile phone. Optionally, the processor 480 may include one or more processing units. Preferably, the processor 480 may integrate an application processor and a modem. The application processor mainly processes an operating system, a user interface, an application program, and the like. The modem mainly processes wireless communication. It may be understood that the foregoing modem may either not be integrated into the processor 480.

The mobile phone further includes the power source 490 (such as a battery) for supplying power to the components. Preferably, the power source may be logically connected to the processor 480 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present technology, the processor 480 included in the terminal may further execute program instructions stored in the memory 420 to perform the image processing method in the foregoing embodiments.

In addition, it should be noted that it should be noted that the described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the art may understand and implement the embodiments of the present technology without creative efforts.

Based on the foregoing descriptions of the embodiments, a person skilled in the art may clearly understand that the present technology may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present technology, software program implementation is a better implementation in most cases. Based on such an understanding, the technical solutions of the present technology essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present technology.

In conclusion, the foregoing embodiments are merely intended for describing the technical solutions of the present technology, but not for limiting the present technology. Although the present technology is described in detail with reference to the foregoing embodiments, a person of ordinary skill in the art should understand that they may still make modifications to the technical solutions described in the foregoing embodiments or make equivalent replacements to some technical features thereof, without departing from the principle and scope of the technical solutions of the embodiments of the present technology.

What is claimed is:

1. An image processing method, comprising:
   at a device having one or more processors, and memory:
   obtaining an image photographed by a camera;
   performing face detection on the image by using a face detection algorithm, to obtain a face pixel set from the image, the face pixel set comprising: a plurality of pixels within an image area belonging to a face in the image;
positioning a facial feature contour mask over the face pixel set, to obtain a to-be-examined pixel set from the face pixel set, the to-be-examined pixel set comprising: a plurality of pixels within an image area except pixels masked by the facial feature contour mask in the face pixel set;
performing edge contour detection on the to-be-examined pixel set;
extracting one or more blemish regions from the to-be-examined pixel set, to obtain a to-be-retouched pixel set, the to-be-retouched pixel set comprising a plurality of pixels within an image area belonging to the one or more blemish regions; and
retouching all pixels in the to-be-retouched pixel set, to obtain a retouched pixel set, wherein, before the performing face detection on the image by using the face detection algorithm to obtain the face pixel set from the image, the method further includes:
decoding the image, to obtain an original image information flow; and
encoding the original image information flow, to obtain an image satisfying a preset format requirement, further including:
performing format conversion on the image, to obtain an image satisfying a YCrCb format requirement, wherein each pixel in the face pixel set is a pixel comprising a Y component, a Cr component, and a Cb component, and each pixel in the to-be-examined pixel set is a pixel comprising a Y component, a Cr component, and a Cb component.

2. The method according to claim 1, including:
detecting an operation instruction that is inputted by a user prior to photographing the image by the camera, wherein the operation instruction triggers a predefined beatifying processing; and
displaying the retouched pixel set to a user as an output from the camera.

3. The method according to claim 2, including:
after displaying the retouched pixel set as the output from the camera, displaying the image captured by the camera only in response to a request by a user.

4. The method according to claim 1, including:
detecting an operation instruction that is inputted by a user after photographing the image by the camera, wherein the operation instruction triggers a predefined beatifying processing function; and
displaying the retouched pixel set to a user in comparison to the image captured by the camera.

5. The method according to claim 1, wherein the performing edge contour detection on the to-be-examined pixel set, and extracting the one or more blemish regions from the to-be-examined pixel set, to obtain the to-be-retouched pixel set comprises:
performing image binarization processing on the to-be-examined pixel set;
removing one or more pixels whose Cr component has a value of 0 from the to-be-examined pixel set on which image binarization processing has been performed, to obtain an edge contour pixel set;
performing a face grayscale image convolution operation on the edge contour pixel set to obtain the edge contour pixel set on which the face grayscale image convolution operation has been accomplished; and
identifying the one or more blemish regions from the edge contour pixel set on which the face grayscale image convolution operation has been accomplished.

6. The method according to claim 1, wherein the retouching the plurality of pixels in the to-be-retouched pixel set, to obtain the retouched pixel set comprises:
changing pixel values of the plurality of pixels in the to-be-retouched pixel set to pixel values of pixels beyond the to-be-retouched pixel set in the to-be-examined pixel set.

7. A system, comprising:
one or more processors; and
memory storing instructions, the instructions, when executed by the one or more processors, cause the processors to perform operations comprising:
obtaining an image photographed by a camera;
performing face detection on the image by using a face detection algorithm, to obtain a face pixel set from the image, the face pixel set comprising: a plurality of pixels within an image area belonging to a face in the image;
positioning a facial feature contour mask over the face pixel set, to obtain a to-be-examined pixel set from the face pixel set, the to-be-examined pixel set comprising: a plurality of pixels within an image area except pixels masked by the facial feature contour mask in the face pixel set;
performing edge contour detection on the to-be-examined pixel set;
extracting one or more blemish regions from the to-be-examined pixel set, to obtain a to-be-retouched pixel set, the to-be-retouched pixel set comprising: a plurality of pixels within an image area belonging to the one or more blemish regions; and
retouching all pixels in the to-be-retouched pixel set, to obtain a retouched pixel set, wherein, before the performing face detection on the image by using the face detection algorithm to obtain the face pixel set from the image, the operations further include:
decoding the image, to obtain an original image information flow; and
encoding the original image information flow, to obtain an image satisfying a preset format requirement, further including:
performing format conversion on the image, to obtain an image satisfying a YCrCb format requirement, wherein each pixel in the face pixel set is a pixel comprising a Y component, a Cr component, and a Cb component, and each pixel in the to-be-examined pixel set is a pixel comprising a Y component, a Cr component, and a Cb component.

8. The system according to claim 7, wherein the operations further include:
detecting an operation instruction that is inputted by a user prior to photographing the image by the camera, wherein the operation instruction triggers a predefined beatifying processing function; and
displaying the retouched pixel set to a user as an output from the camera.

9. The system according to claim 8, wherein the operations further include:
after displaying the retouched pixel set as the output from the camera, displaying the image captured by the camera only in response to a request by a user.

10. The system according to claim 7, wherein the operations further include:

detecting an operation instruction that is inputted by a user after photographing the image by the camera, wherein the operation instruction triggers a predefined beatifying processing function; and displaying the retouched pixel set to a user in comparison to the image captured by the camera.

11. The system according to claim 7, wherein the performing edge contour detection on the to-be-examined pixel set, and extracting the one or more blemish regions from the to-be-examined pixel set, to obtain the to-be-retouched pixel set comprises:

performing image binarization processing on the to-be-examined pixel set;

removing one or more pixels whose Cr component has a value of 0 from the to-be-examined pixel set on which image binarization processing has been performed, to obtain an edge contour pixel set;

performing a face grayscale image convolution operation on the edge contour pixel set to obtain the edge contour pixel set on which the face grayscale image convolution operation has been accomplished; and identifying the one or more blemish regions from the edge contour pixel set on which the face grayscale image convolution operation has been accomplished.

12. The system according to claim 7, wherein the retouching the plurality of pixels in the to-be-retouched pixel set, to obtain the retouched pixel set comprises:

changing pixel values of the plurality of pixels in the to-be-retouched pixel set to pixel values of pixels beyond the to-be-retouched pixel set in the to-be-examined pixel set.

13. A non-transitory computer-readable storage medium storing instructions, the instructions, when executed by one or more processors, cause the processors to perform operations comprising:

obtaining an image photographed by a camera;

performing face detection on the image by using a face detection algorithm, to obtain a face pixel set from the image, the face pixel set comprising: a plurality of pixels within an image area belonging to a face in the image;

positioning a facial feature contour mask over the face pixel set, to obtain a to-be-examined pixel set from the face pixel set, the to-be-examined pixel set comprising: a plurality of pixels within an image area except pixels masked by the facial feature contour mask in the face pixel set;

performing edge contour detection on the to-be-examined pixel set;

extracting one or more blemish regions from the to-be-examined pixel set, to obtain a to-be-retouched pixel set, the to-be-retouched pixel set comprising: a plurality of pixels within an image area belonging to the one or more blemish regions; and retouching all pixels in the to-be-retouched pixel set, to obtain a retouched pixel set wherein, before the performing face detection on the image by using the face detection algorithm to obtain the face pixel set from the image, the operations further include:

decoding the image, to obtain an original image information flow; and encoding the original image information flow, to obtain an image satisfying a preset format requirement, further including:

performing format conversion on the image, to obtain an image satisfying a YCrCb format requirement, wherein each pixel in the face pixel set is a pixel comprising a Y component, a Cr component, and a Cb component, and each pixel in the to-be-examined pixel set is a pixel comprising a Y component, a Cr component, and a Cb component.

14. The computer-readable storage medium according to claim 13, wherein the operations further include:

detecting an operation instruction that is inputted by a user prior to photographing the image by the camera, wherein the operation instruction triggers a predefined beatifying processing function; and displaying the retouched pixel set to a user as an output from the camera.

15. The computer-readable storage medium according to claim 14, wherein the operations further include:

after displaying the retouched pixel set as the output from the camera, displaying the image captured by the camera only in response to a request by a user.

16. The computer-readable storage medium according to claim 13, wherein the operations further include:

detecting an operation instruction that is inputted by a user after photographing the image by the camera, wherein the operation instruction triggers a predefined beatifying processing function; and displaying the retouched pixel set to a user in comparison to the image captured by the camera.

17. The computer-readable storage medium according to claim 13, wherein the performing edge contour detection on the to-be-examined pixel set, and extracting the one or more blemish regions from the to-be-examined pixel set, to obtain the to-be-retouched pixel set comprises:

performing image binarization processing on the to-be-examined pixel set;

removing one or more pixels whose Cr component has a value of 0 from the to-be-examined pixel set on which image binarization processing has been performed, to obtain an edge contour pixel set;

performing a face grayscale image convolution operation on the edge contour pixel set to obtain the edge contour pixel set on which the face grayscale image convolution operation has been accomplished; and identifying the one or more blemish regions from the edge contour pixel set on which the face grayscale image convolution operation has been accomplished.

18. The computer-readable storage medium according to claim 13, wherein the retouching the plurality of pixels in the to-be-retouched pixel set, to obtain the retouched pixel set comprises:

changing pixel values of the plurality of pixels in the to-be-retouched pixel set to pixel values of pixels beyond the to-be-retouched pixel set in the to-be-examined pixel set.

* * * * *